United States Patent
Prasad et al.

[11] 3,853,846
[45] Dec. 10, 1974

[54] INOSINE-5-CARBOXYLATES

[75] Inventors: Raj Nandan Prasad, Pierrefonds, Quebec, Canada; Herman Hal Stein, Skokie, Ill.

[73] Assignee: Abbott Laboratories, Chicago, Ill.

[22] Filed: Feb. 12, 1973

[21] Appl. No.: 331,398

[52] U.S. Cl. .......................... 260/211.5 R, 424/180
[51] Int. Cl. ............................................ C07d 51/54
[58] Field of Search ............................. 260/211.5 R

[56] References Cited
UNITED STATES PATENTS
3,697,504  10/1972  Schmidt .................. 260/211.5 R
FOREIGN PATENTS OR APPLICATIONS
2,034,785  1/1972  Germany .................. 260/211.5 R Primary Examiner—Johnnie R. Brown
Attorney, Agent, or Firm—Robert L. Niblack; Joyce R. Krei; Vincent A. Mallare

[57] ABSTRACT

Inosine-5′-carboxylates represented by the formula

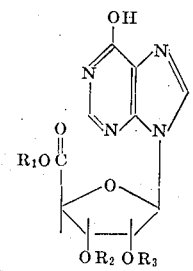

wherein $R_1$ is loweralkyl, lowerhaloalkyl, or lowerhydroxyalkyl and $R_2$ and $R_3$ each are hydrogen or acyl, or $R_2$ and $R_3$ when taken together form an isopropylidene or benzylidene moiety, and the pharmaceutically acceptable salts thereof. The compounds of this invention are useful in preparing the corresponding amides which are useful as sedatives and hypotensive agents.

6 Claims, No Drawings

INOSINE-5-CARBOXYLATES

DETAILED DESCRIPTION OF THE INVENTION

This invention relates to inosine-5'-carboxylates, and to methods of preparing the compounds.

The compounds of this invention are represented by the formula

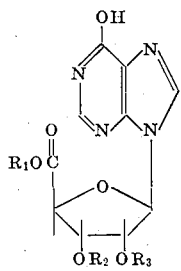

wherein $R_1$ is loweralkyl, lowerhaloalkyl, or lowerhydroxyalkyl and $R_2$ and $R_3$ each are hydrogen or acyl, or $R_2$ and $R_3$ when taken together form an isopropylidene or benzylidene moiety, and the pharmaceutically acceptable salts thereof. The compounds of this invention are useful in preparing the corresponding amides which are useful as sedatives and hypotensive agents.

The term "loweralkyl" as used herein, refers to both straight and branched chain alkyl radicals containing from 1 to 6 carbon atoms, including methyl, ethyl, n-propyl, iso-propyl, n-butyl, sec-butyl, tert-butyl, iso-butyl, n-pentyl, iso-pentyl, neo-pentyl, n-hexyl and the like.

The term "acyl" refers to acetyl, propionyl, butyryl and the like.

The term "halo" includes chloro, fluoro, bromo, and diodo.

The term "pharmaceutically acceptable salts" refers to either the nontoxic acid addition salts prepared by reacting the ester with an appropriate organic or inorganic acid, or by utilizing an acid addition salt of the appropriate intermediate. Representative salts include the hydrochloride, hydrobromide, sulfate, bisulfate, acetate, valerate, oleate, laurate, borate, benzoate, lactate, phosphate, tosylate, citrate, maleate, succinate, tartrate, napsylate and the like, as well as the cationic salts such as the sodium, potassium, aluminum, calcium, magnesium, barium, ammonium and substitute ammonium salts.

The term "substituted ammonium" includes, but is not limited, to methyl ammonium, diethyl ammonium, benzyl ammonium, triethanol ammonium, and the like.

The compounds of this invention are useful as intermediates in the preparation of the corresponding amides which are useful as sedatives and hypotensive agents.

Generally speaking, the compounds of this invention are prepared from 2',3'-isopropylidene inosine by the following route:

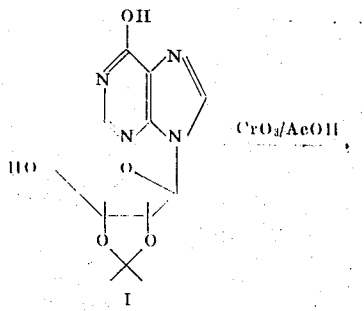

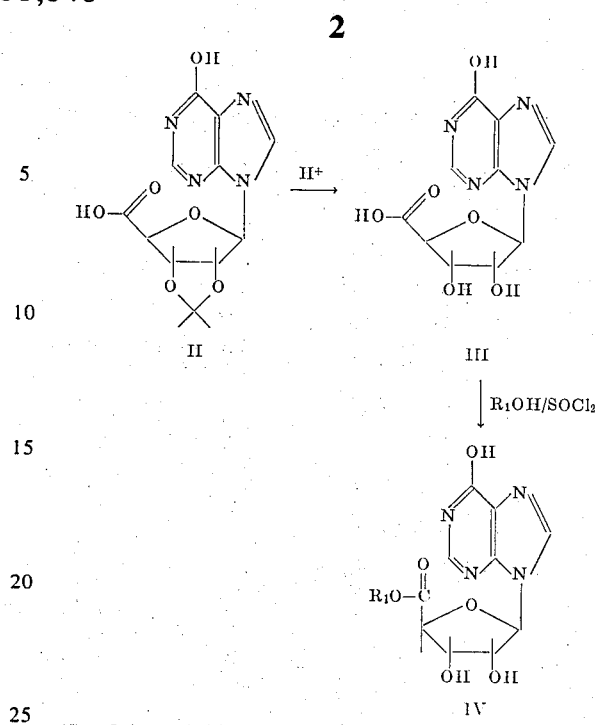

The following examples further illustrate this invention

EXAMPLE 1

2',3'-0-Isopropylidene Inosine-5'-Carboxylic Acid

Chromium trioxide (12.0 g, 0.120 mole; freshly washed with glacial acetic acid) was added, portionwise, to a stirred solution of isopropylidene inosine (32.0 g; 0.0104 mole) in glacial acetic acid (500 ml.) at room temperature. Within a few hours, the dark reaction mixture spontaneously warmed up to 35°C. No attempt was made to control the temperature. The reaction mixture was stirred at room temperature for three days. The crude acid was filtered, washed with cold acetic acid, followed by ether and finally the residue was washed with plenty of cold water to give a colorless solid. The solid, after drying over $P_2O_5$ in vacuo at 60°C. for 16 hours, was pure enough for the subsequent reactions. Yield - 24.0 g. (72%); m.p. 260° dec; $R_f$ 0.30 (7:2:1 Isopropanol:$H_2O$:$NH_4OH$); characteristic IR band at 1720 cm$^{-1}$.

EXAMPLE 2

INOSINE-5'-CARBOXYLIC ACID

A mixture of 2', 3'-O-isopropylidene inosine-5'-carboxylic acid (6.4 g; 0.020 mole), concentrated HCl (30 ml.) and water (300 ml.) was kept at 60°C. for 30 minutes and then cooled to 0°C. The clear reaction mixture was brought to pH 2.5–3.0 by adding $NaHCO_3$ solution and the product was filtered and washed with cold water to yield 4.4 g. (79%) of inosine-5'-carboxylic acid, m.p. 170–175°C; $R_f$ 0.21;(7:2:1 isopropanol:$H_2O$:$NH_4OH$); characteristic IR band at 1720 cm$^{-1}$.

EXAMPLE 3

Inosine-5'-($\beta$-Chloroethyl) Carboxylate

Thionyl chloride (4 ml.) was added dropwise to a suspension of inosine-5'-carboxylic acid (5.7 g; 0.0202 mole) in 2-chloroethanol (100 ml) at 5–10°C. After the addition was complete, the mixture was stirred at room temperature for 3 hours and then poured into dry stirred ether (300 ml.). The ether was decanted carefully and the viscous layer was triturated with some more ether. The solid, so separated, was dissolved in cold water (30 ml.) and the clear aqueous solution was basified with saturated aqueous NaHCO$_3$ solution. The precipitate was filtered off, washed successively with water, acetone and ether and dried in vacuum for 4 hours over P$_2$O$_5$ at 65°C.

Yield - 5.5 g (80%); m.p. 177–180°. Infra-red spectra showed the characteristic band at 1750 cm$^{-1}$; R$_f$ 0.35 (43:7 n-butanol: H$_2$O).

EXAMPLE 4

Inosine-5'-carboxylic acid, ethyl ester is prepared according to the method of Example 3 by reacting ethyl alcohol with inosine-5'-carboxylic acid.

EXAMPLE 5

Inosine-5'-carboxylic acid, methyl ester is prepared according to the method of Example 3 by reacting methyl alcohol with inosine-5'-carboxylic acid.

EXAMPLE 6

Inosine-5'-carboxylic acid, n-propyl ester is prepared according to the method of Example 3 by reacting n-propyl alcohol with inosine-5'-carboxylic acid.

EXAMPLE 7

Inosine-5'-carboxylic acid, iso-propyl ester is prepared according to the method of Example 3 by reacting iso-propyl alcohol with inosine-5'-carboxylic acid.

EXAMPLE 8

Inosine-5'-carboxylic acid, n-butyl ester is prepared according to the method of Example 3 by reacting n-butyl alcohol with inosine-5'-carboxylic acid.

EXAMPLE 9

Inosine-5'-carboxylic acid, sec-butyl ester is prepared according to the method of Example 3 by reacting sec-butyl alcohol with inosine-5'-carboxylic acid.

EXAMPLE 10

Inosine-5'-carboxylic acid, tert-butyl ester is prepared according to the method of Example 3 by reacting tert-butyl alcohol with inosine-5'-carboxylic acid.

EXAMPLE 11

Inosine-5'-carboxylic acid, n-pentyl ester is prepared according to the method of Example 3 by reacting n-pentyl alcohol with inosine-5'-carboxylic acid.

EXAMPLE 12

Inosine-5'-carboxylic acid, iso-pentyl ester is prepared according to the method of Example 3 by reacting iso-pentyl alcohol with inosine-5'-carboxylic acid.

EXAMPLE 13

Inosine-5'-carboxylic acid, neo-pentyl ester is prepared according to the method of Example 3 by reacting neo-pentyl alcohol with inosine-5'-carboxylic acid.

EXAMPLE 14

Inosine-5'-carboxylic acid, n-hexyl ester is prepared according to the method of Example 3 by reacting n-hexyl alcohol with inosine-5'-carboxylic acid.

EXAMPLE 15

Inosine-5'-carboxylic acid, hydroxyethyl ester is prepared according to the method of Example 3 by reacting hydroxyethyl alcohol with inosine-5'-carboxylic acid.

EXAMPLE 16

Inosine-5'-carboxylic acid, iodomethyl ester is prepared according to the method of Example 3 by reacting iodomethyl alcohol with inosine-5'-carboxylic acid.

We claim:
1. A compound of the formula

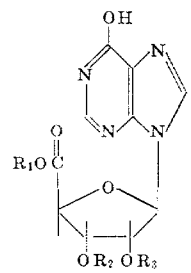

wherein R$_1$ is loweralkyl, lowerhaloalkyl, or lowerhydroxyalkyl and R$_2$ and R$_3$ each are hydrogen or loweralkanoyl, or R$_2$ and R$_3$ when taken together form an isopropylidene or benzylidene moiety, and the pharmaceutically acceptable salts thereof.

2. A compound of claim 1 wherein R$_2$ and R$_3$ each are hydrogen.

3. A compound in accordance with claim 2 wherein R$_1$ is loweralkyl.

4. A compound in accordance with claim 2 wherein R$_1$ is hydroxyalkyl.

5. A compound in accordance with claim 2 wherein R$_1$ is haloalkyl.

6. A compound in accordance with claim 5, inosine-5'-carboxylic acid, chloroethyl ester.

* * * * *

UNITED STATES PATENT AND TRADEMARK OFFICE
CERTIFICATE OF CORRECTION

PATENT NO. : 3,853,846
DATED : December 10, 1974
INVENTOR(S) : Raj Nandan Prasad and Herman Hal Stein It is certified that error appears in the above-identified patent and that said Letters Patent are hereby corrected as shown below:

In the title:

Delete "INOSINE-5-CARBOXYLATES"

and substitute therefor --INOSINE-5'-CARBOXYLATES--

In Column 2, first line of formulae, patent line 5, delete the "$H^+$" between the two formulas and substitute therefor --$H^{\oplus}$--

Signed and Sealed this twenty-fifth Day of November 1975

[SEAL]

Attest:

RUTH C. MASON
*Attesting Officer*

C. MARSHALL DANN
*Commissioner of Patents and Trademarks*